United States Patent [19]

Wilhelm

[11] 4,218,232
[45] Aug. 19, 1980

[54] METHOD OF SHAPING MOVING SHEETS ON ROLL FORMING APPARATUS

[75] Inventor: Richard E. Wilhelm, Galion, Ohio

[73] Assignee: PPG Industries, Inc., Pittsburgh, Pa.

[21] Appl. No.: 4,432

[22] Filed: Jan. 18, 1979

[51] Int. Cl.² .......................................... C03B 23/02
[52] U.S. Cl. ........................................ 65/106; 65/106
[58] Field of Search ............... 65/104, 106, 107, 245, 65/253, 273, 286

[56] References Cited

U.S. PATENT DOCUMENTS

| | | | |
|---|---|---|---|
| 2,348,887 | 5/1944 | Drake | 65/106 |
| 3,545,951 | 12/1970 | Nedelec | 65/104 |
| 3,701,644 | 10/1972 | Frank | 65/106 |
| 3,801,298 | 4/1974 | Bezombes | 65/104 |
| 3,831,239 | 8/1974 | Hoff et al. | 65/106 X |
| 3,832,153 | 8/1974 | Bezombes | 65/291 |
| 3,856,499 | 12/1974 | Frank | 65/104 |
| 3,869,269 | 3/1975 | Knapp | 65/106 |
| 3,871,855 | 3/1975 | Frank | 65/245 |
| 3,881,906 | 5/1975 | Ritter et al. | 65/104 |
| 3,891,420 | 6/1975 | Frank | 65/106 |
| 3,905,794 | 9/1975 | Revells et al. | 65/106 |
| 3,929,441 | 12/1975 | Frank | 65/106 |
| 3,934,996 | 1/1976 | Frank | 65/106 |
| 3,992,181 | 11/1976 | Frank | 65/104 |
| 4,015,968 | 4/1977 | Revells et al. | 65/289 |
| 4,043,783 | 8/1977 | Frank | 65/106 |
| 4,047,919 | 9/1977 | Revells | 65/273 |
| 4,116,662 | 9/1978 | Revells | 65/107 X |
| 4,123,246 | 10/1978 | Johnson | 65/104 |
| 4,139,359 | 2/1979 | Johnson et al. | 65/107 |

Primary Examiner—Arthur D. Kellogg
Attorney, Agent, or Firm—Dennis G. Millman; Edward I. Mates

[57] ABSTRACT

In forming heat-softened sheets by the roll forming method, continuously moving sheets of heat-softenable material, such as glass sheets, are conveyed continuously by spaced rotating cylindrical rolls along a conveyer into a roll forming station, where a set of rotating shaping rolls move transversely upward between adjacent stationary cylindrical conveyor rolls to provide rolling engagement against the lower surface of each moving glass sheet in succession in spaced relation above the level of the path of travel defined by the stationary conveyor rolls for sufficient time to shape the sheets. The sets of rotating shaping rolls move the shaped sheet onto a conveyor that extends through a cooling station. The sheets are flat entering the roll forming station and shaped to a curved configuration on leaving the roll forming station. The upper surfaces of the sheets are not touched during said shaping.

3 Claims, 13 Drawing Figures

METHOD OF SHAPING MOVING SHEETS ON ROLL FORMING APPARATUS

BACKGROUND OF THE INVENTION

1. Field of the Invention

The present invention relates generally to the production of shaped, tempered sheets of heat-softenable material and, more particularly, to an improved method of and apparatus for shaping and heat treating relatively thin glass sheets.

Shaped glass sheets are widely used as side windows and roof panels in vehicles such as automobiles or the like and, to be suitable for such applications, flat glass sheets must be shaped to precisely defined curvatures dictated by the shape and outline of the frames defining the window openings into which the glass windows or panels are installed. It is also important that the side windows or panels meet stringent optical requirements and that the windows or panels be free of optical defects that would tend to interfere with the clear viewing therethrough in their viewing area. During fabrication, glass sheets intended for use as shaped windows or panels in vehicles are subjected to thermal treatment to temper the glass for strengthening the same and increasing the resistance of the shaped windows to damage resulting from impact.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. To promote efficient and large scale production, discrete glass sheets are conventionally heated, bent and cooled while being moved continuously along a fixed path and successively through a heating section, a roll forming section, and a cooling section. To achieve satisfactory temper, the temperature of the glass sheet must be above a predetermined minimum level so as to maintain the core or interior thereof above a deformation temperature upon being exposed initially to cooling medium at the cooling section. The residual heat remaining in glass sheets of previous commercial thicknesses, such as those having nominal thicknesses ranging from 4.5 millimeters to 6 millimeters, is generally sufficient after shaping for immediate advancement to the tempering area and exposure to the cooling medium. Thus, the heat initially imparted to a relatively thick glass sheet to bring it to proper temperature for shaping can also be utilized in the final heat treating operation.

However, within the last several years, considerable emphasis has been placed on the use of thinner and thinner glass sheets for automobile side windows as a means of reducing overall weight of the autos as a means to obtain better fuel mileage. This has posed problems in shaping and tempering, due to the lesser ability of the thinner sheets to retain heat and the aforementioned conventional process of bending and treating glass sheets does not lend itself to the processing of these relatively thin sheets, such as those having nominal thicknesses ranging from less than 3 millimeters to 4 millimeters (90 mils to 160 mils). As the thickness of the glass decreases, the rate of heat loss increases and the heat initially imparted to such thin sheets is quickly dissipated upon leaving the heating atmosphere of the furnace and during the relatively cool bending cycle. Attempts to solve these problems by initially overheating the thin glass sheets have not been successful because of the consequent loss of control of the glass shaping process and the degradation of the surface quality of the finished glass as a result of heat stains, roll ripple distortion, and the imposition of roll marks in the surface of the heat-softened glass sheet.

Consequently, roll forming has ben developed as a technique for shaping and tempering glass sheets at a high production rate. One of the benefits of the roll forming process is the rapid removal of each individual glass sheet from the heating section or furnace through the shaping section and into the quenching section. In the roll forming method, glass sheets are conveyed without stopping through heating, shaping, and tempering sections along high speed glass sheet conveyor means to drastically reduce the time needed to traverse the distance between the exit of the heating section or furnace to the tempering or quenching section to a minimum, preferably under 5 seconds. Under such circumstances, thin glass sheets can be tempered by quenching without imparting such a high initial temperature at the furnace that shape control and control of surface quality is lost as a consequence of insuring that the temperature at the core of each glass sheet does not cool to below the minimum temperature needed on arrival at the quenching section to assure adequate temper. However, moving glass sheets engaged simultaneously between upper and lower rotating forming rolls tend to skew and/or to develop rub marks in the glass surfaces unless the operation of the forming rolls is carefully controlled.

In roll forming as practiced in the prior art, either a continuous glass ribbon or a series of discrete glass sheets is heated to or above the deformation temperature of the glass and passed in a continuous motion through one or more shaping stations where the glass sheets pass between upper and lower rotating forming rolls of complementary shape to change the glass sheets from a flat configuration to a shaped configuration. Shaping individual glass sheets by roll forming, particularly those of non-rectangular shape having one or both longitudinal side edges extending obliquely of the path of glass sheet movement, is more difficult to perform than roll forming a continuous ribbon, because individual glass sheets having leading edges as well as side edges that are prone to be distorted by a high speed shaping operation, whereas only the side edges of a continuous ribbon are more prone to distortion than the main body of the glass.

The history of prior art attempts to shape glass sheets continuously without causing the glass sheets to stop for the shaping step so as to obtain as high a production rate of shaped glass sheets as possible and the problems associated with shaping thin glass sheets will be understood better in the light of a description of the prior art that follows.

2. Description of the Prior Art

Many patents have been issued on roll forming.

Drake U.S. Pat. No. 2,348,887 moves heated glass sheets between a pair of aligned pressure rolls 32 and 33 of cylindrical configuration which force the bottom surfaces of the glass sheets to ride over a series of spaced bending rolls 31 of cylindrical configuration mounted for rotation along spaced lines that extend transversely of a curved pth corresponding to the shape desired for the bent glass sheets. The shapes imparted to the moving glass sheets are limited to cylindrical curvatures of uniform radius about an axis transverse to the path of glass movement. Simultaneous rolling contact of the pressure rolls against the upper and lower surfaces causes surface marring.

Ritter et al U.S. Pat. No. 3,881,906 sags heated glass sheets to intermediate shapes of progressively increasing curvature transverse to their path of movement by conveying said heated glass sheets on successive, contoured, rotating, conveyor rolls of increasing transverse curvature en route to a shaping station. The entire weight of a transversely extending leading element of the glass is borne entirely along the side edge portions of the glass as it transfers from one contoured forming roll to the next. Consequently, the lateral edges kink away from the overall curvature desired and it is necessary to stop each partially shaped glass sheet at a shaping station where its shaping is corrected by the inertia gravity method which involves the use of a shaping mold that moves in an upward vertical direction transverse to both the glass movement path and the axes of rotation of the contoured rolls to engage the glass sheet margin while the glass sheet forward movement is stopped.

U.S. Pat. Nos. 3,545,951, Bezombes 3,801,298 and 3,832,153 and Hoff et al. 3,831,239 shape moving glass sheets between shaped conveyor rolls that support the lower surface of moving heat-softened glass sheets and a movable upper shaping member of complementary configuration. The apparatus of these patents provides a family of simple curves about a single axis transverse to the path of glass sheet movement. These patents require the shaped conveyor rolls to rotate between different orientations from a flat glass supporting position to a shaped glass supporting position. The change in orientations must be correlated with glass sheet movement to obtain desired results. The simultaneous contact of rollers against the upper and lower glass sheet surfaces marks the glass.

U.S. Pat. Nos. Frank 3,701,644; 3,856,499; 3,871,855; 3,891,420; 3,929,441; 3,934,996; 3,992,181 and 4,043,783, and Knapp 3,869,269 disclose roll forming apparatus capable of shaping a succession of discrete moving glass sheets to either simple shapes provided with one component of shape about either an axis extending longitudinally of the path of glass sheet movement or about an axis extending transversely thereof or compound shapes involving various combinations of two components conforming to said simple shapes. In addition, the roll forming apparatus of this group of patents is capable of shaping glass sheets to either simple or compound shapes involving non-uniform radii of curvature.

This last group of patents provides different inventions incorporated in the most sophisticated system for shaping continuously moving glass sheets to various shapes at the highest rates of production attained prior to the present invention. However, even though this last group of patents provided the greatest variety of simple and compound shapes for glass sheets ever attained, the apparatus comprised movable parts whose movement between spaced apart positions on opposite sides of a path of movement provided by conveyor rolls for glass sheets and glass engaging positions where the rotating forming rolls engage the opposite major surfaces of the sheets to one side of said conveyor rolls had to be correlated with the glass sheet movement between the movable parts. This correlation required constant monitoring and frequent adjustment of moving parts in order to avoid surface marring and/or skewing of the glass sheets. In addition, it was necessary to spend considerable time for set up and adjustment of the apparatus when production patterns were changed to insure that the movements of the rotating shaping rolls toward and away from one another correlate properly with the movement of discrete glass sheets therebetween. Furthermore, simultaneous engagement of forming rolls against portions of the upper and lower glass sheet surfaces causes some residual light surface marking despite the precautions that are taken to reduce the severity of such surface marking.

U.S. Pat. No. 3,905,794 to Revells et al. discloses shaped conveyor rolls that rotate in unison from a flat glass supporting position to a rotated position where their central portions are lowered as a shaping mold lifts a stopped glass sheet into engagement with a complementary shaped upper shaping mold. This apparatus precludes continuous movement of the glass sheets through the shaping station en route to the cooling station, thereby limiting the maximum rate of production and the maximum temper possible.

U.S. Pat. No. 4,015,968 to Revells et al., U.S. Pat. No. 4,047,919 and U.S. Pat. No. 4,116,662 to Revells disclose different embodiments of shaped conveyor rolls used in conjunction with shaping molds that engage a glass sheet conveyed on said rolls to a glass sheet shaping station. Each of these patented apparatus stops the forward movement of the glass sheet at the shaping station to lift the glass sheet on the lower shaping mold. Such stopping increases the time needed to transport the hot glass sheet from the furnace exit to the entrance of the quenching station.

U.S. Pat. No. 4,123,246 to Johnson et al. discloses shaping glass sheets by gradually transferring a succession of glass sheets from an obliquely disposed series of stationary, cylindrically shaped conveyor rolls onto alternately disposed, shaped, rotating, stationary forming rolls and thence onto a succession of stationary, shaped, rotating, consecutive forming rolls en route to a cooling station without stopping movement of the glass sheets undergoing such treatment.

None of the patents disclose shaping a glass sheet by transferring it in the upstream portion of a shaping station from stationary, horizontally aligned, longitudinally spaced, cylindrically shaped, rotating conveyor rolls by lifting the moving glass sheets onto a first series of alternate, rotating, shaped, upwardly and rectilinearly translatable forming rolls and thence in the downstream portion of the shaping station onto a second series of consecutive, shaped, upwardly and rectilinearly translatable shaping rolls that move upwardly in unison with the alternate forming rolls of the first series in the upstream portion of the shaping station without engaging the upper surfaces of the sheets with a solid member.

SUMMARY OF THE INVENTION

The present invention provides a method and apparatus for shaping glass sheets by a roll forming method involving a relatively minor modification of an existing roll forming station. While the present invention was developed for the purpose of heat-treating relatively thin glass sheets that are replacing the relatively thicker sheets used commercially in the past, it is understood that the present invention is also useful in producing bent, tempered sheets of glass and other heat-softenable materials of greater thickness used in commercial vehicles prior to the recent conversion to thinner windows and panels in automobiles.

The roll forming station of the present invention includes an upstream portion and a downstream portion. The upstream portion comprises stationary, rotating conveyor rolls of cylindrical configuration that are fixed in position relative to one another alternating with a first series of vertically movable, shaped, forming rolls. The downstream portion of the roll forming station comprises a second series of consecutive, additional shaped forming rolls vertically adjustable in unison with the shaped forming rolls of the first series and forming a continuation of said first series.

Hot glass sheets are transported through an enclosed furnace in which they are heated to a temperature sufficiently high for tempering. Upon leaving the exit of the furnace, they are transported by rolling contact on rotating transfer conveyor rolls to the stationary conveyor rlls in the upstream portion while the vertically movable, shaped, forming rlls are supported below the path of travel of the glass sheets moving into the upstream portion of the shaping station. The shaped, rotating, forming rolls rise to reach the level of the plane occupied by a tangent common to the stationary, rotating conveyor rlls in the upstream portion at approximately the time the entire length of the moving glass sheet is within the shaping station. As the shaped forming rolls continue to rise, the forming rolls lift the side edge portions of the moving glass sheet while the central portion of the sheet remains in partial contact with the stationary, rotating conveyor rolls in the upstream portion.

The forming rolls of the upstream portion and those of the second series in the downstream portion are lifted in unison relative to the main body of the glass to provie controlled transfer of the glass sheet from spaced, straight lines of support by the stationary, rotating conveyor rolls of cylindrical configuration to complete support along spaced, transversely extending, curved lines of support by upwardly moving, shaped, forming rolls of transverse configuration of curved elevation. This gradual transfer of support is believed to control the uniformity of glass sheet shaping from sheet to sheet and minimize the extent of uncontrolled sagging. Once the transfer from the cylindrical conveyor rolls to shaped forming rolls is completed, the glass sheets continue their movement while supported by adjacent, shaped, rotating, forming rolls of the second series in the downstream portion. The latter are located in more closely spaced relation to one another than the adjacent shaped rolls of the first series in the upstream portion of the shaping station.

In the roll forming station of a specific embodiment, each forming roll has a given transversely curved configuration. Each succeeding forming roll is segmented and mounted for rotation on a shaft, and preferably comprises a curved shaping surface of concave elevation. Each forming roll in the roll forming section has a curved configuration conforming to the given transverse curvature of concave elevation formed by each of the other forming rolls.

The combination of alternate shaped forming rolls and cylindrically shaped conveyor rolls so disposed enables the upstream portion of the roll forming station to support successive increments of continuously moving glass sheets on straight lines of support at their transverse center portions that gradually diminish in transverse length onto shaped lines of support that gradually increase in length from the side edges to the center transversely of the path taken by the glass sheets through the roll forming station. Supporting part of the mass of the glass sheet on the central portion of the stationary conveyor rolls while gradually increasing the length of the transverse end portions supported by rotating forming rolls controls the glass sheet shaping in a manner that reduces edge kinking as the flat, heat-softened glass sheets are transferred from the furnace to gradually develop a shape transverse to their path of movement that is related to the transverse curvature common to said rotating forming rolls according to a controlled program of shaping.

By the time a glass sheet reaches the downstream portion of the glass shaping station, it is supported continuously across its entire transverse dimension on shaped, rotating, forming rolls of the second series that are relatively closely spaced from one another longitudinally along the path of glass sheet travel. Additional conveyor rolls of shaped configuration are provided in the cooling station downstream of and in elevational alignment with the forming rolls of the shaping station when the latter are in their raised positions. The shaped conveyor rolls in the cooling station are made as short as possible, but have a minimum length equal to the width of glass sheets processed.

In the method performed by this apparatus, each glass sheet in the series is heated to at least its deformation temperature. The shaping operation begins with the entire length of the glass sheet supported across its entire width on the spaced rotating surfaces of the stationary, cylindrical conveyor rolls. Then said glass sheet moves upwardly over the rotating forming rolls, which rise to support the transverse extremities of the glass sheet only on their shaped rotating surfaces initially. Gradually, as the shaped, rotating forming rolls continue to rise, the heated glass sheet is supported on successively shorter lines of support extending transversely outward from its transverse center portion and successively longer curved lines of support along its transversely opposite side edge portions until the curved lines of support extending inward from its transverse extremities merge to form a series of longitudinally closely spaced, continuous, curved lines of support extending transversely of the path of glass sheet movement and the transverse center support of flat configuration is eliminated altogether. This gradual transfer of the glass sheet from support by stationary cylindrical rolls to support by upward moving rolls of curved configuration improves the control of the shaping operation and reduces the tendency of the glass sheets to kink at their transverse edges or to skew during their shaping.

The apparatus also includes a cooling station. Additional conveyor rolls having transverse curvatures approximating those of the rotating forming rolls are adjustably mounted for alignment with the forming rolls to provide a smooth continuation of the path of glass sheet travel along which the forming rolls are disposed in the upper positions that the rotating forming rolls occupy when they are lifted. This provides a smooth transition from the shaping station to the cooling station.

The curved conveyor rolls in the upstream portion of the cooling station are of the same curvature as the forming rolls. However, the curved conveyor rolls in the cooling station are as short as possible, yet have a minimum length equal to the width of the shaped glass sheets of the pattern undergoing processing.

Lifting the forming rolls in unison lifts the entire length of each glass sheet in turn in a straight upward motion that minimizes the possibility of skew. Omitting any upper forming rolls from the shaping station removes another possible cause of skew and also reduces the possibility of surface marking of the glass resulting from the glass sheet surfaces being simultaneously engaged by opposite forming roll segments that rotate at different peripheral speeds.

These and other benefits of the present invention will become obvious in the light of a description of a preferred embodiment of this invention that follows. While the description of the preferred embodiment relates to the treatment of thin glass sheets, it is understood that the present invention is also useful in the treatment of thicker glass sheets as well.

BRIEF DESCRIPTION OF THE DRAWINGS

In the description of the preferred embodiment of the present invention, the following drawings form an important part. In these drawings, like reference numbers are applied to like structural elements.

In the drawings.

DESCRIPTION OF THE PREFERRED EMBODIMENT

Figure 1:
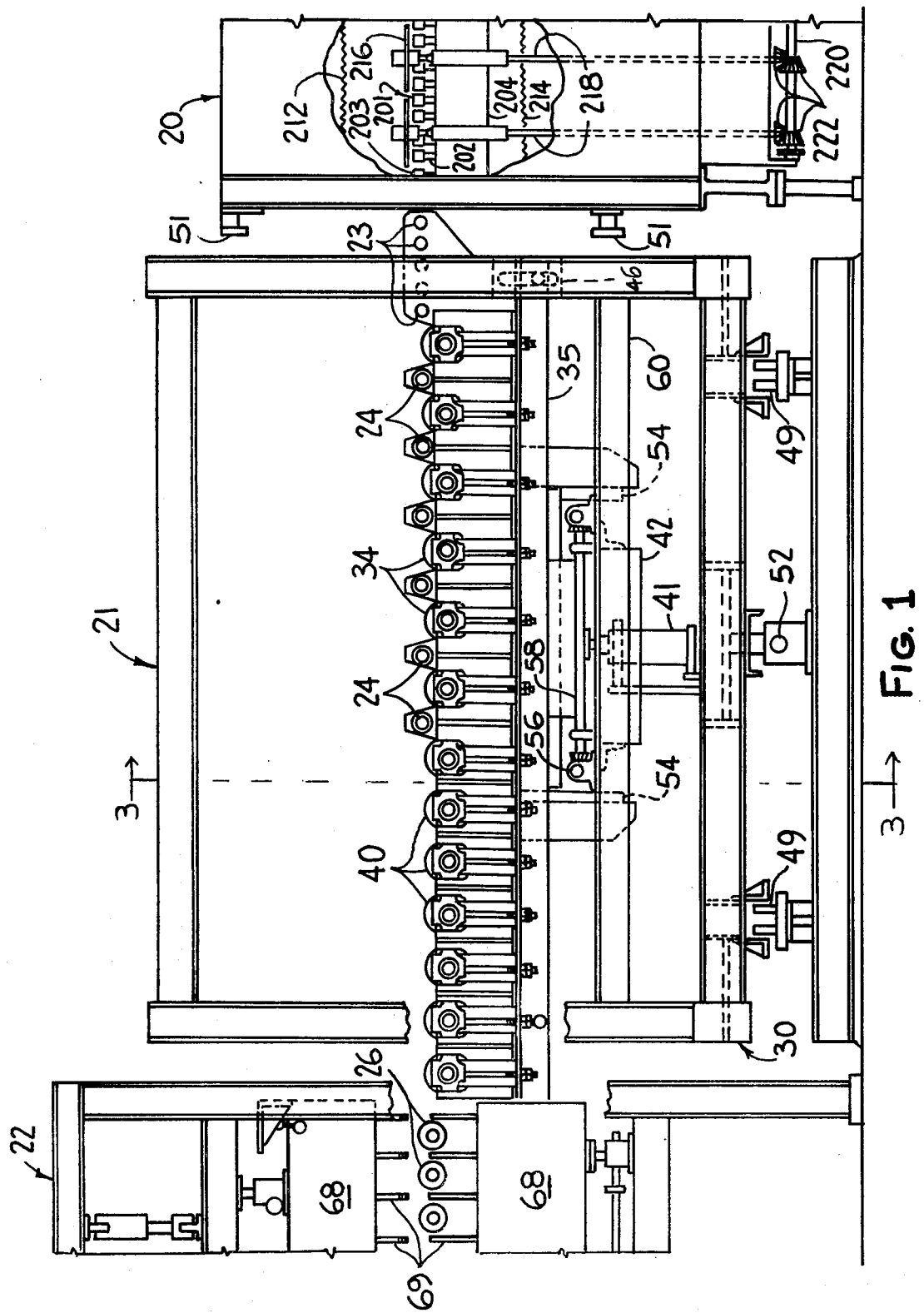
FIG. 1 is a side elevational view of a roll forming station constructed according to a preferred embodiment of the present invention, showing its relation to the downstream portion of a heating furnace, and a transfer conveyor section at one end thereof and a cooling station at the downstream end thereof.

Referring to the drawings, FIG. 1 discloses a side view of a roll forming apparatus conforming to a preferred embodiment of the present invention. The roll forming apparatus of the present invention comprises a tunnel-type heating furnace 20, a shaping station 21 of the roll forming type, and a cooling station 22.

A glass sensing device 51 of the type well known in the art, such as an ultraviolet or infrared sensing device, is located between the exit of the furnace 20 and the entrance to the shaping station 21 to detect the passage of the trailing edge of a glass sheet to actuate operation of the shaping station 21 to perform its sheet forming function.

A conveyor system extends through the length of the furnace 20, the shaping station 21 and the cooling station 22. The heating furnace 20 is of gas hearth type, although a roller hearth type of furnace may be substituted. In a gas hearth system, such as the one used in the preferred embodiment (which is based on apparatus depicted in U.S. Pat. No. 3,233,501 to James C. Fredley et al), the furnace is provided with a flat bed formed of a series of modules 201 in spaced but close juxtaposition to each other and arranged geometrically like a mosaic. Each module has an upper terminus of rectangular configuration. The upper termini lay in a common plane that is obliquely arranged at an angle of five degrees to the horizontal transversely of the bed and that extends horizontally lengthwise of the bed.

The modules 201 are arranged in successive rows crossing the path of travel intended for glass sheets undergoing treatment, each row being at an oblique angle of about ten degrees to the path taken by the glass sheets. Each row is spaced close to the next adjacent row. Each module 201 has a relatively narrow stem 202 of similar cross-sectional area to that of the upper terminus and each opens up into a module plenum chamber 203, positioned below the bed and acting as a support for the bed.

Each module is substantially enclosed and spaced from adjacent modules by an exhaust zone. The bed is adjusted to such a level that the plane of the upper termini of the modules lies parallel to, but just below a plane defined by the upper surface of the conveyor rolls 24 of the shaping station 21.

The narrow stems 202 are in communication with an elongated plenum chamber 204 which received hot gas from a series of gas burners 206 through conduits 208. Conventional electric heating elements 212 and 214 are disposed above and below the elongated plenum chamber 204. Hot gas is supplied to the elongated plenum chamber 204 under pressure for delivery through the individual modules 201 to provide a hot gaseous bed on which glass sheets are supported in an oblique, almost horizontal plane while they are heated to a temperature sufficient for deformation.

The glass sheets are engaged along their lower side edges only by means of a series of driving discs 216 disposed in a series along the lower side edge of the bed. Each of the driving discs 216 is mounted on a different rotating shaft 218 of a series of shafts connected to a main drive shaft 220 through suitable bevel gears 222. The discs rotate in unison to propel a series of glass sheets along the length of the gaseous bed toward the shaping station 21.

The conveyor system beyond the furnace exit comprises a series of longitudinally spaced, transversely extending, transfer conveyor rolls 23 of one inch (25.4 mm) diameter disposed at 2⅝ inch (66.7 mm) spacing just beyond the exit of the furnace 20 for conveying a succession of glass sheets G therealong. The transfer conveyor rolls 23 disposed in the furnace are preferably made of stainless steel and are of cylindrical configuration and rigid.

Stationary conveyor rolls 24, also of rigid stainless steel shaft construction and of cylindrical configuration, each having an outer diameter of 1 inch and spaced on 7 inch (177.8 mm) centers, are located in the upstream portion only of the shaping station 21 and are covered with thin sleeves of fiber glass. Additional shaped conveyor rolls 26, of the type found suitable for use in the cooling station 22 and which are transversely curved to conform to the transverse shape imparted to the glass sheets in the shaping station 21, are disposed in the cooling station 22, or at least in the entrance portion of the cooling station. The rolls 26 are as short as possible, but must have a minimum length equal to the width of the shaped glass sheets to assure continuous support at both transverse end portions.

Figure 2:
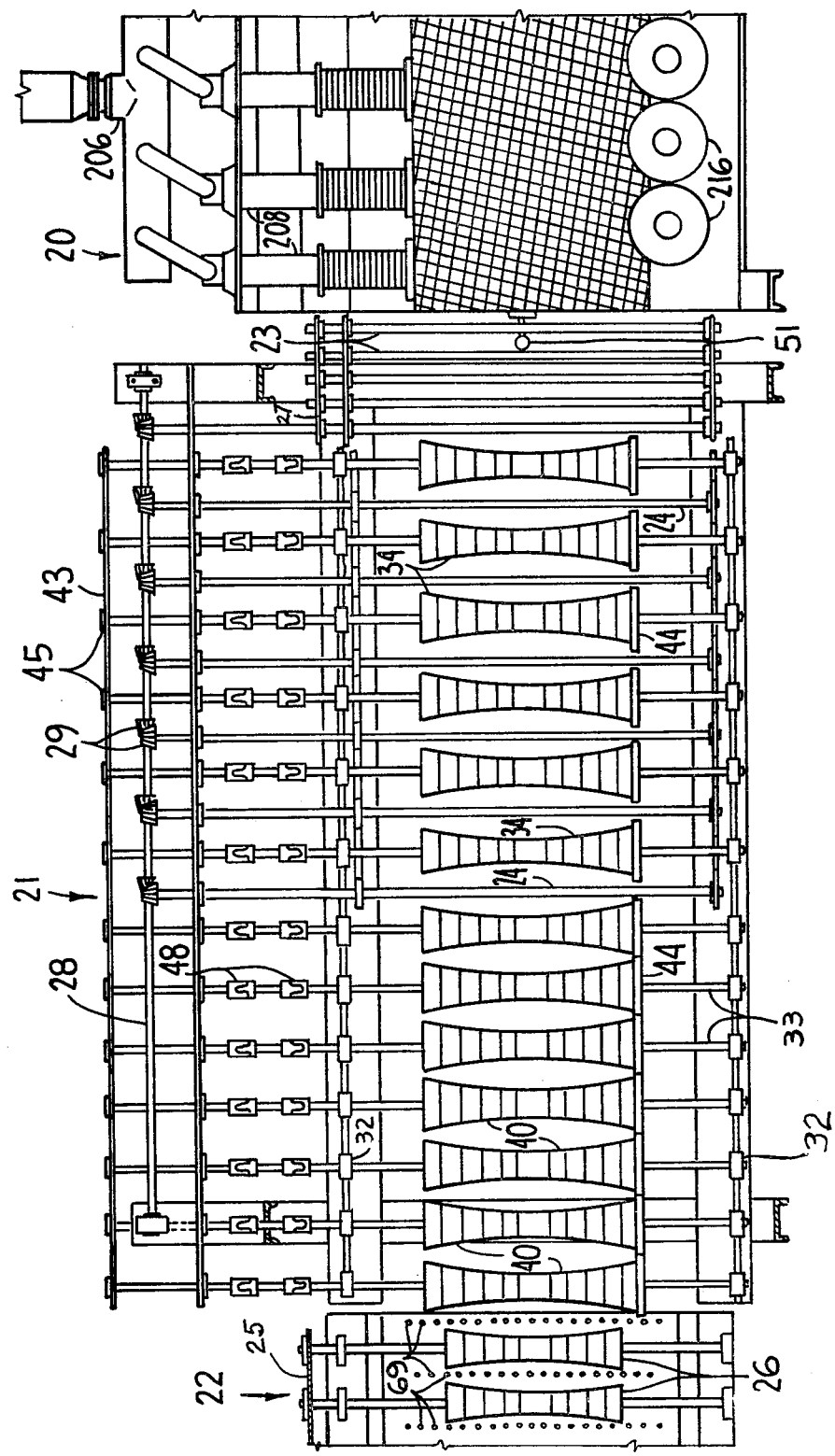
FIG. 2 is a plan view of a horizontal section of the apparatus depicted in FIG. 1 with end segments omitted from the shaped conveyor rolls in the cooling station to facilitate explanation of a technique to adjust the apparatus for treating narrower glass sheets.

The conveyor rolls 23 and 24 form a conveyor system that transfers glass sheets from the furnace 20 to the shaping station 21. Each conveyor roll 23 is driven by a chain and sprocket connection 27 to the most downstream conveyor roll 23 and thence to a main drive shaft 28 through the most upstream pair of bevel gears 29 and each conveyor roll 24 is directly connected by bevel gears 29 to main drive chain 28 as shown in FIG. 2. If desired, certain conveyor rolls of one section may be disconnected by clutches from the motor driving one conveyor section for a driving connection to a motor driving another conveyor section, in a manner well known in the art. Also, the conveyor sections may be further subdivided, or the entire conveyor system may be made as one continuous section, as desired. In the illustrative embodiment, rolls 26 are rotated by an independent chain drive 25 (FIG. 2).

The shaping station 21 of the present invention comprises an open reinforced frame structure 30 to which is movably supported a forming roll support housing 31. The forming roll support housing is oriented in an oblique plane parallel to the oblique plane of support provided by the gas hearth system. The forming roll support housing 31 comprises a pair of sets of vertical brackets 32. Each of the latter is located in spaced relation at 7 inch (177.8 mm) spacing along a row intersected by one of two spaced vertical planes that extend longitudinally of the conveyor system to receive one of a series of straight, common shafts 33 near one or the other of its ends.

The brackets 32 are adjustably positioned to support the series of common shafts 33 either in alignment with one another either in an oblique plane parallel to the plane of support provided by the upper tangent common to the conveyor rolls 23 and 24 of the conveyor system or in a horizontal plane or in adjustment along a curved line defined by the position of each bracket 32 along each of the two longitudinally extending, spaced, vertical planes or any combination of horizontal, oblique or curved lines as dictated by the nature of the shape to be imparted to the glass sheets being shaped.

Each of the common shafts 33 rotatably supports one of a first series of segmented forming rolls 34 in the upstream portion of the shaping station 21 or one of a second series of identical forming rolls 40 in the downstream portion of the shaping station. Each segment of the segmented forming rolls 34 or 40 is approximately two inches (5 mm) long axially, except for the centermost segments which are approximately four inches (10 mm) long. Each central shaping segment is flanked by an equal number of flanking shaping segments on either side thereof. The outer surfaces of the segments are smoothly curved to provide a transversely extending curved configuration of concave elevation.

An apertured longitudinally extending upper horizontal angle member 35 is supported along each side of the lower forming roll support housing 31. Each aperture of each upper horizontal angle member 35 is vertically aligned below an internally threaded member extending downwardly from a corresponding one of the brackets 32. A series of threaded shafts 36 have their upper ends connected to the brackets 32 and their lower ends extending through a corresponding aperture of one or the other of the upper horizontal angle members 35. Suitable lock nuts 37 are provided along each shaft 36 above and below a corresponding upper member 35 to adjust the axial position of the threaded shafts 36 relative to the horizontal angle member 35 so as to fix the position of each bracket 32 relative to the lower roll housing support structure 31. Each upper horizontal member 35 interconnects a pair of end plates 38. A roller 39 is attached to each end of each end plate 38 in a manner to be described later.

The vertical position of each bracket 32, as determined by adjustment of its associated threaded shaft 36, controls the position of an end portion of a common shaft 33. The adjusted position of each pair of brackets 32 of each common shaft 33 establishes the orientation of the segmented forming rolls 34 and 40 that are mounted on the shafts 33. Each shaft 33 is straight to facilitate mounting and replacement of the segments of a forming roll of desired configuration thereon. It is thus a simple matter to remove one set of forming rolls conforming to one configuration and replace its segments with another set of forming rolls whose segments conform to another configuration whenever parts of a different configuration are to be produced.

The rolls in the shaping station 21 comprise a set of stationary conveyor rolls 24 of cylindrical configuration, a first series of shaped forming rolls 34 located in vertical planes intermediate adjacent cylindrical stationary conveyor rolls 24, and a second series of shaped forming rolls 40 located downstream of the first series. The forming rolls of the second series are more closely spaced to one another than the adjacent forming rolls of the first series. All of the forming rolls 34 and 40 have substantially identical curved configurations. A collar 44 is fixed to each shaft 33 to abut the lower edge of each of the forming rolls 34 and 40.

The forming roll support housing 31 is rigidly attached to a piston 41 mounted on a piston support structure 42 attached to the open reinforced frame structure 30. A pair of vertical slotted plates 46 is carried by the frame structure 30 for receiving the rollers 39 attached to each end plate 38 of the lower forming roll support housing 31. A crossbeam 47 is attached to the upper end of piston 41 and interconnects the end plates 38 which are also interconnected by the apertured angle members 35. This provides a rigid structure for the forming roll support housing 31 so that the forming rolls 34 and 40 supported by said forming roll support housing 31 move in unison in response to actuation by the piston 41.

Figure 3:
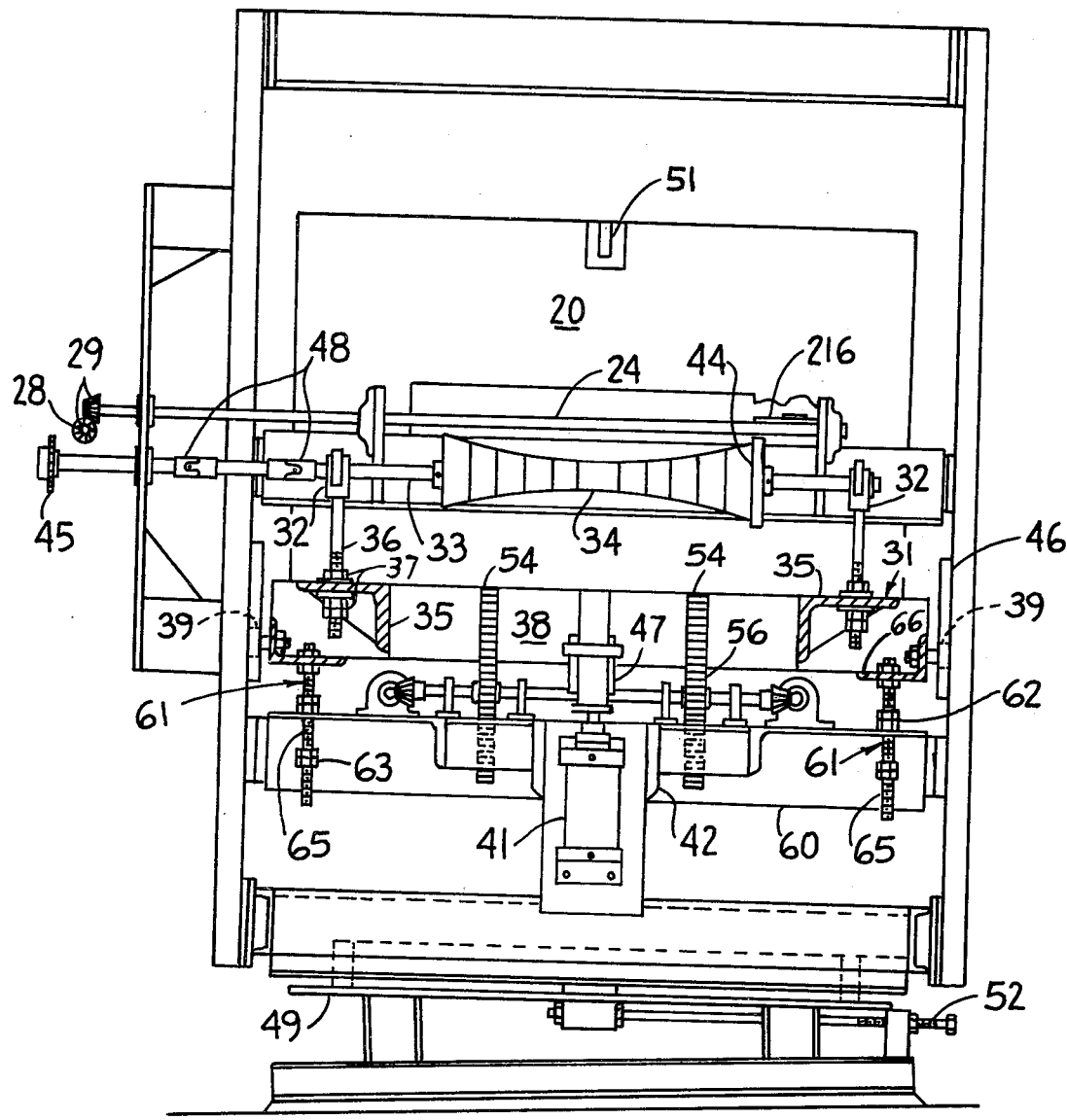
FIG. 3 is a vertical sectional view taken along the line 3—3 of FIG. 1.

As seen in FIGS. 2 and 3, the segments of the segmented forming rolls 34 of the first series and forming rolls 40 of the second series are smoothly curved to form a substantially continuous concave contour in the axial direction of the straight common shafts 33. This shape conforms to the shape desired about an axis parallel to the path the glass sheet takes through the shaping station 21 for an incremental portion of each glass sheet shaped by roll forming.

Hence, if all the segmented rolls 34 and 40 have their shafts aligned, when piston 41 is extended upwardly, the segmented rolls 34 and 40 are lifted in unison to positions above the plane occupied by the tangent common to the upper portion of the circumferences of the stationary conveyor rolls 24 in the shaping station 21. Each upwardly moving, rotating forming roll below the moving sheet engages different increments of a heat-softened sheet moving through the shaping station when the piston 41 is extended upward a sufficient distance to lift the segmented forming rolls 34 of the first series in the upstream portion of the shaping station 21 into positions of rolling engagement against the undersurface of the sheet. The latter becomes gradually free to sag between its gradually diminishing straight lines of support centrally on the stationary conveyor rolls 24 and its gradually increasing curved lines of support along its ends on the first series of rolls 34. Thus, the rotating forming rolls 34 impose gradually increasing bending forces on different longitudinal increments of the traveling sheet simultaneously as the glass sheet traverses the upstream portion of the shaping station 21. The second set of forming rolls 40 continue to move upward in alignment with the first set and provide more closely spaced curved lines of support for the sheet in the downstream portion of the shaping station 21.

The composition of the roll segments is very important to insure proper operation of the roll forming apparatus with minimum glass breakage or glass marking. The material must have a low thermal conductivity to minimize thermal shock on the hot glass when the latter engages the relatively cold shaping rolls. The rolls must have a low coefficient of thermal expansion over a wide range of temperatures of approximately 600° F. (333° C.) from room temperature to an elevated temperature that the forming rolls attain on periodically contacting hot glass. They must be of a composition that does not react chemically with glass, that is durable over said wide temperature range, and is readily shaped or machined to complex contours. To meet the aforesaid requirements, the segments of the forming rolls 34 and 40 and of the shaped conveyor rolls 26 in the upstream portion of the cooling station 22 are composed of an asbestos cement of alumino-silica composition sold by Johns Manville under the trademark of TRANSITE.

In order to minimize marking of the glass surface due to rubbing by portions of the shaping rolls whose peripheral velocity differs sufficiently from the speed of the glass sheet moving through the roll forming apparatus to cause observable rubbing marks, only selected segments of the segmented forming rolls 34 and 40 are keyed to the shafts 33 to rotate therewith and the remaining segments of the forming rolls are freely rotatable relative to the shafts. In addition, low friction devices are disposed between adjacent segments to minimize friction between adjacent segments.

Suitable driving means are provided to rotate the keyed segments of forming rolls 34 and 40 at optimum peripheral speed. The shafts 33, which rotatably support the forming rolls 34 and 40, are connected to a common drive chain 43 through sprockets 45 and flexible coupling means 48.

The entire open frame structure 30 is mounted on transverse guides 49 for transverse alignment by adjustment means 52. This construction also facilitates removal of one shaping station and its replacement by another shaping station adjusted to produce glass sheets of a different pattern with minimum interruption to continuous operation.

In order to assure proper alignment between the upper support position for the shaping rolls 34 and 40 and the conveyor rolls 24, the housing 31 is provided with an alignment mechanism. The alignment mechanism comprises four racks 54 extending downward from housing 31 to mesh with certain gears 56 of a rectangular array 58 of lower horizontal connecting rods and gears connected to a lower platform 60 forming part of the frame structure 30, and to which is attached the piston support structure 42.

The forming roll support housing 31 is provided with stop members 61. Each of the stop members 61 comprises a lower limit adjustment means 62 and an upper limit adjustment means 63 in the form of lock nuts adjustably mounted on one of a plurality of threaded shafts 65. Each of the latter is rigidly secured at its upper end to the lower forming roll support housing 31 and extends through an aperture in the lower platform 60 of the open reinforced frame structure 30 with lower limit adjustment means 62 disposed above the lower platform 60 and the upper limit adjustment means 63 disposed below the lower platform 60. The upper ends of the threaded shafts 65 are secured to the horizontal flange of one or the other of a pair of lower, horizontal angle members 66 that interconnect the end plates 38 and support the rollers 39 intermediate their connections to the opposite end plates 38.

In a typical roll forming operation performed by the shaping station 21, a series of flat glass sheets is propelled through the furnace 20 by edgewise friction applied to the lower edge surfaces of the glass sheets by the rotating discs 216 while the sheets float over the surfaces of the gas hearth modules 201. Then, the leading sheet in the furnace (which has been heated to a temperature of about 1200° to 1300° F. (649° to 704° C.) is transferred over the rotating transfer conveyor rolls 23 and onto the stationary conveyor rolls 24 at the upstream portion of the shaping station 21.

When the trailing edge of each glass sheet passes between a transmitter and a receiver of the glass sensing device 51, a timer circuit (not shown) adjusted to the conveyor speed is actuated. When the timer circuit times out, piston 41 is actuated to lift the rotating forming rolls 34 and 40 in unison from a retracted position entirely beneath the elevation of the transfer conveyor rolls 23 and the stationary conveyor rolls 24 to an elevated position entirely above said elevation, to maintain the rotating forming rolls in their elevated position for sufficient time for the glass sheet to pass through the shaping station 21 and to enter the cooling station, and to return the forming rolls to their retracted position before the next glass sheet in the series actuates the glass sensing device 51.

Figure 4:
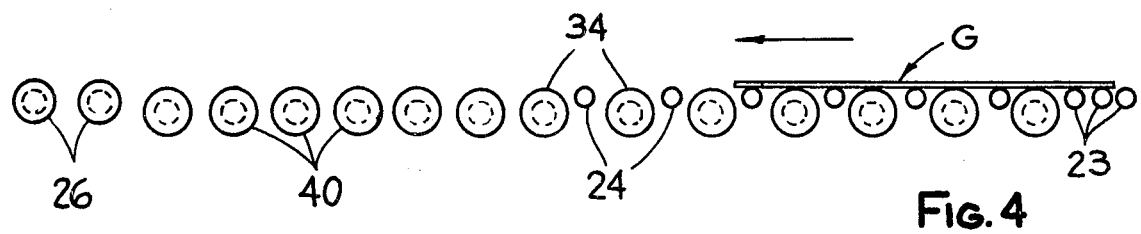
FIG. 4 is a schematic, longitudinal elevation of the roll forming station of the preferred embodiment, showing a flat glass sheet entering the shaping station.
Figure 5:
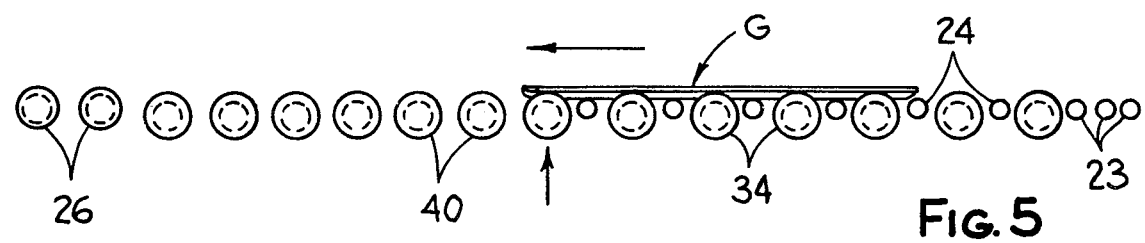
FIG. 5 is a view similar to FIG. 4 showing the relative positions of forming rolls and conveyor rolls in the shaping station as the glass sheet continues its movement through the shaping station.
Figure 8:
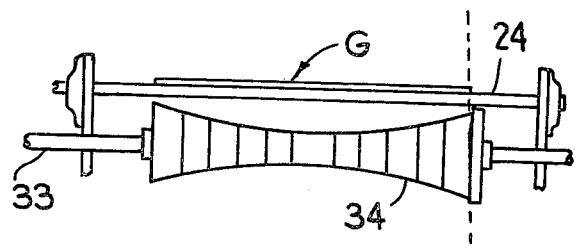
FIG. 8 is a view transverse to FIG. 4.
Figure 9:
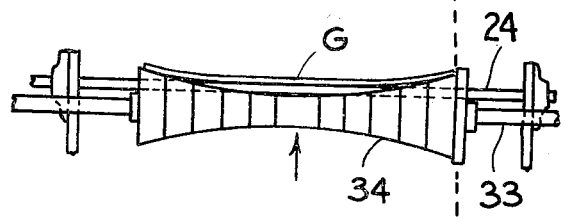
FIG. 9 is a view transverse to FIG. 5.

FIGS. 4 and 8 show the respective positions occupied by the rotating forming rolls 34 and 40 below the upper common tangential plane of the conveyor rolls 23 and 24 when a flat glass sheet G is entering the shaping station 21. FIGS. 5 and 9 show the positions occupied by the glass sheet G and the forming rolls 34 and 40 when the glass sheet G has completely entered the upstream portion of the shaping station 21 and the rotating forming rolls 34 and 40 are being lifted in unison and are passing through the oblique plane occupied by the conveyor rolls 24 in the upstream portion of the shaping station 21. As is clearly seen in FIGS. 5 and 9, the transverse center portion of the glass sheet rests on a plurality of cylindrically shaped conveyor rolls 24 while the end portions are being lifted as the forming rolls 34 and 40 are rising.

Figure 6:
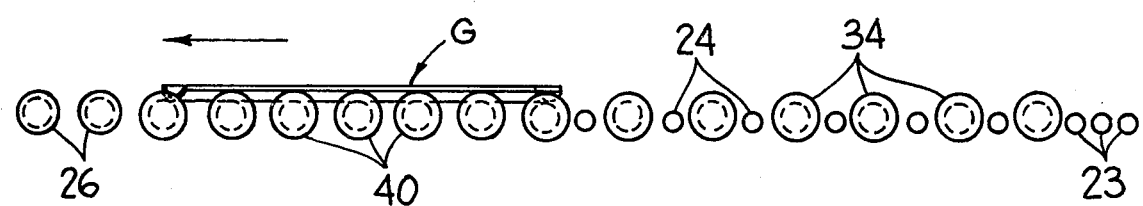
FIG. 6 is a view similar to FIGS. 4 and 5 showing the arrangement of the forming rolls and the conveyor rolls when the glass sheet is in the downstream portion of the shaping station.

The forming rolls 34 and 40 rise in unison to extend the transverse lines of end support for the sheets laterally inward while the central lines of support for the sheet by the stationary, cylindrical, conveyor rolls 24 gradually diminish and the sheets sag transversely toward the forming rolls 34. By the time the glass sheet G reaches the position in the downstream portion of the shaping station 21 depicted in FIGS. 6 and 10, the sheet is supported on curved lines of support provided by consecutive forming rolls 40, which are aligned with the forming rolls 34 and are more closely spaced than the adjacent forming rolls 34 in the first portion of the shaping station 21.

Figure 7:
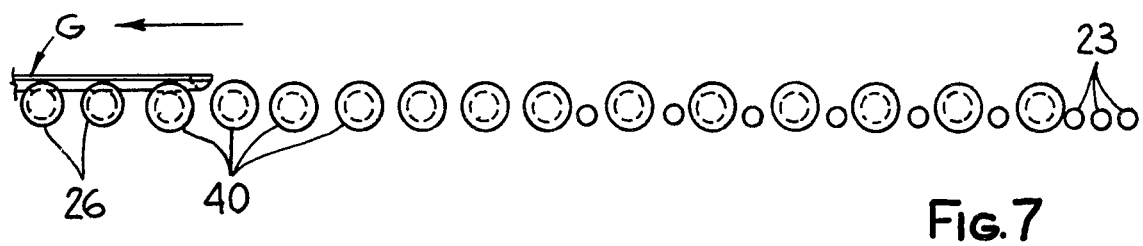
FIG. 7 is a view similar to FIGS. 4, 5 and 6, showing the relationship of the glass sheet to the forming rolls and the conveyor rolls as the glass sheet leaves the shaping station.

The glass sheet G is shown in FIG. 7 leaving the downstream portion of the shaping station 21 and entering the cooling station 22. To effect a smooth transfer, each glass sheet is transferred onto the shaped conveyor rolls 26 of the cooling station 22 at a time when the forming rolls 34 and 40 are at their upward positions. The shaped conveyor rolls 26 are similar in shape to the forming rolls 34 and 40, and are in path alignment therewith to facilitate smoothness of transfer. The conveyor rolls 26 in the cooling station 22 have a minimum length equal to the width of glass sheets treated, but are as short as possible to improve the escape of cold tempering medium from the opposite surfaces of the shaped sheets in the cooling station 21.

The cooling station 22 may be of any type of glass tempering or heat-strengthening apparatus that is well known in the art. One type of cooling station that may be used is disclosed in U.S. Pat. No. 3,245,772 to James H. Cypher and Charles R. Davidson, Jr. Preferably, the best embodiment of the present invention comprises upper and lower nozzle boxes 68, each having a set of longitudinally spaced, transversely extending rows of elongated pipe nozzles 69 extending transversely of the path defined by the shaped conveyor rolls 26 that are longitudinally spaced along the cooling station 22. The pipe nozzles are preferably narrow in diameter and closely spaced from one another along each transverse row and adjacent rows of nozzles are more widely spaced.

Typical nozzle arrangements include nozzles having an inner diameter of ⅜ to ½ inch (0.95 to 1.27 centimeters) spaced about 2 inches (5.08 centimeters) apart along each row of nozzles. The rows are longitudinally spaced about 4 inches (10.16 centimeters) apart.

The nozzle openings of one set are about 5 inches (127 mm) from the nozzle openings of the other set, and aligned in transverse planes that intersect the spaces between adjacent shaped conveyor rolls 26. The latter have an outer diameter of 2 inches (5 centimeters) or less at their axial ends and decrease in diameter toward their central portion as needed to conform to the shape of glass sheets being conveyed through the cooling station 22. The exact structure of the cooling station forms no part of the present invention and this description thereof is made as brief as possible because any cooling station used to temper glass sheets on a roller hearth may be used in conjunction with the present invention.

Pressurized air from blowers (not shown) is supplied to the upper and lower nozzle boxes 68 for discharge through the pipe nozzles 69 to cool bent glass sheets as they are conveyed through the cooling station 22. The amount of pressure depends on the glass thickness and degree of temper desired.

If desired, exit doors of the type well known in the art may be included to intermittently close the exit slot openings of the furnace 20 and a similar door may be included at the entrance of the cooling station 22 to intermittently close the opening to the cooling station 22. This minimizes the exposure of the shaping station to the hot atmosphere of the furnace 20 at one end and to the cold blasts of the cooling station 22 at the other end. However, such doors have been found to be unnecessary when a shaping station 21 between the exit of furnace 20 and the upstream end of cooling station has a length of 6 feet (183 cm).

The apparatus of the present invention provides spaced lines of rolling support across the entire width of heat-softened flat glass sheets entering the shaping station 21 and simultaneous upward lifting of the end portions of each sheet in turn on shaped forming rolls 34 that conform to the shape of the bent glass sheets at the upstream portion of the shaping station. Increased lifting of the rotating forming rolls 34 and 40 provides a positive support and positive driving force to transfer the bent glass sheets to the cooling station 22. The shaped conveyor rolls 26 are specially constructed to provide a continuation into the cooling station 22 of the path of shaped sheet movement provided by the forming rolls 34 and 40 in the shaping station 21.

The apparatus of the illustrative embodiment can be readily adapted for treating sheets of different width. In order to handle narrower sheets, one or more of the lowest segments of the forming rolls 34 and 40 is (are) reversed to provide an abutment for the lower edges of glass sheets traversing the shaping station 24. The adjustment means 52 may be used to align the abutment provided by the reversed segment with the tangential line common to the driving discs 216.

Figure 10:
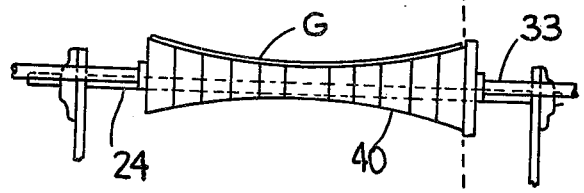
FIG. 10 is a view transverse to FIG. 6.
Figure 11:
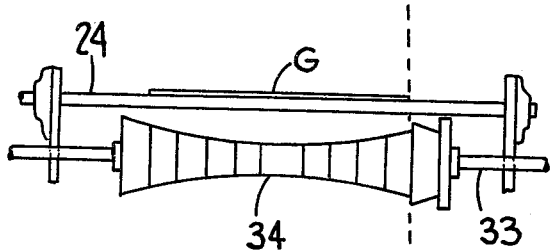
FIG. 11 is a view similar to FIG. 8 showing how the apparatus may be adjusted to handle narrower glass sheets.
Figure 12:
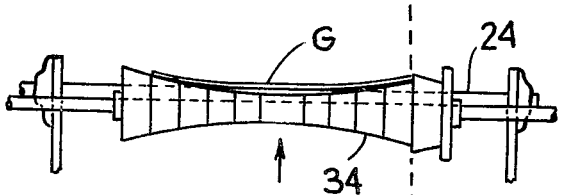
FIG. 12 is a view similar to FIG. 9 showing the apparatus adjusted as in FIG. 11.
Figure 13:
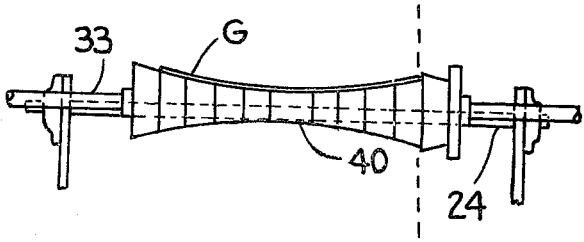
FIG. 13 is a view similar to FIG. 10 showing the apparatus adjusted to provide the handling of the narrower glass sheet than the one treated by the apparatus adjusted as in FIGS. 1 to 10.

FIGS. 11, 12 and 13 show how narrower sheets are treated according to a program similar to that depicted in FIGS. 8, 9 and 10 for handling wider sheets. In FIG. 11, the narrower sheet is entering the shaping station 21. In FIG. 12, the narrower sheet is in the process of being transferred from the conveyor rolls 24 to the shaped forming rolls 34. In FIG. 13, the forming rolls 34 and 40 have been raised to their upper positions in alignment with the shaped conveyor rolls 26 for transfer to the cooling station 22.

The plan view of FIG. 2 shows one segment removed from each end of the shaped conveyor rolls 26 in the cooling station 22. Ordinarily, when the roll forming apparatus is adjusted according to FIGS. 1 to 10, these end segments will be included to provide shaped support for glass sheets 24 inches (60.96 centimeters) wide in both the shaping station 21 and the cooling station 22. However, for treating narrower sheets, for example, 20 inches (50.8 centimeters) wide, where the lowermost segments of shaping rolls 34 and 40 are reversed to provide abutments to control the lateral position of the glass sheets, omission of the end segments from the shaped conveyor rolls 26 provides shaped rolling support across the entire width of the narrower glass sheets and would be used when the forming rolls 34 and 40 are arranged as depicted in FIGS. 11, 12 and 13.

The glass sheet temperature as it enters the cooling station 22 must be at a minimum of about 1175° F. (635° C.). For glass sheets moving at a speed of 800 to 1000 inches per minute (33.8 to 42.3 centimeters per second) through a shaping station 6 feet (183 centimeters) long, a glass sheet temperature of 1200° to 1300° F. (649° to 705° C.) is desirable at the exit of the furnace 20.

This description shows a shaping station treating glass sheets approximately half its length. However, glass sheets up to 60 inches (1524 centimeters) long have been successfully shaped at a shaping station 72 inches (1828.8 centimeters) long.

To handle glass sheets having widths up to 24 inches (61 centimeters), the following roll to roll spacings, found to be suitable for imparting cylindrical curves having different radii of curvature, is reported in the following table.

| FORMING ROLL SPACING FOR DIFFERENT RADII OF CURVATURE | | |
|---|---|---|
| | Spacing Between Adjacent Forming Rolls | |
| Radius of Curvature | In Upstream Portion | In Downstream Portion |
| 43 inches (109 cm) | 7 inches (17.8 cm) | 5¼ inches (14.0 cm) |
| 60 inches (152 cm) | 6 inches (15.2 cm) | 4¼ inches (10.8 cm) |
| 90 inches (229 cm) | 6 inches (15.2 cm) | 4¼ inches (10.8 cm) |

The form of the invention shown and described herein represents an illustrative preferred embodiment thereof and it is understood that the specific details of structure and operation are given by way of example and that various changes may be made, such as treating sheets of materials other than glass and of various thicknesses, without departing from the gist of the invention as defined in the claimed subject matter that follows.

I claim:

1. A method of shaping a series of discrete glass sheets comprising:
   heating each glass sheet to a softened condition;
   conveying the heated glass sheet in a longitudinal direction on rotating, cylindrical conveyor rolls having axes extending horizontally and transversely to the longitudinal direction;
   lifting as a unit a side portion of the moving glass sheet along an entire longitudinal edge of the glass sheet by bringing contoured, rotating shaping rolls between at least some of the conveyor rolls into contact with the underside of said side portion, so as to raise said side portion above the level of support of the conveyor rolls; and
   as the glass sheet continues to be conveyed in the longitudinal direction, maintaining the glass sheet in contact with a sequence of raised shaping rolls for a sufficient time to cause the glass sheet to sag into conformity with the contour of the shaping rolls solely by force of gravity.

2. The method of claim 1 wherein the raising and sagging of the glass sheet are initiated on a first series of contoured shaping rolls having cylindrical conveyor rolls interposed between pairs thereof, and are subsequently carried further toward completion on a second series of contoured shaping rolls directly adjacent to each other.

3. The method of claim 2 wherein the axis-to-axis spacing of the second series of shaping rolls is closer than that of the first series of shaping rolls.

* * * * *